Aug. 18, 1970     W. G. BALLENGER     3,524,655
INFANT STROLLER

Filed Sept. 18, 1968     2 Sheets-Sheet 1

INVENTOR.
William G. Ballenger
BY Dominik, Knechtel & Godula
Attys.

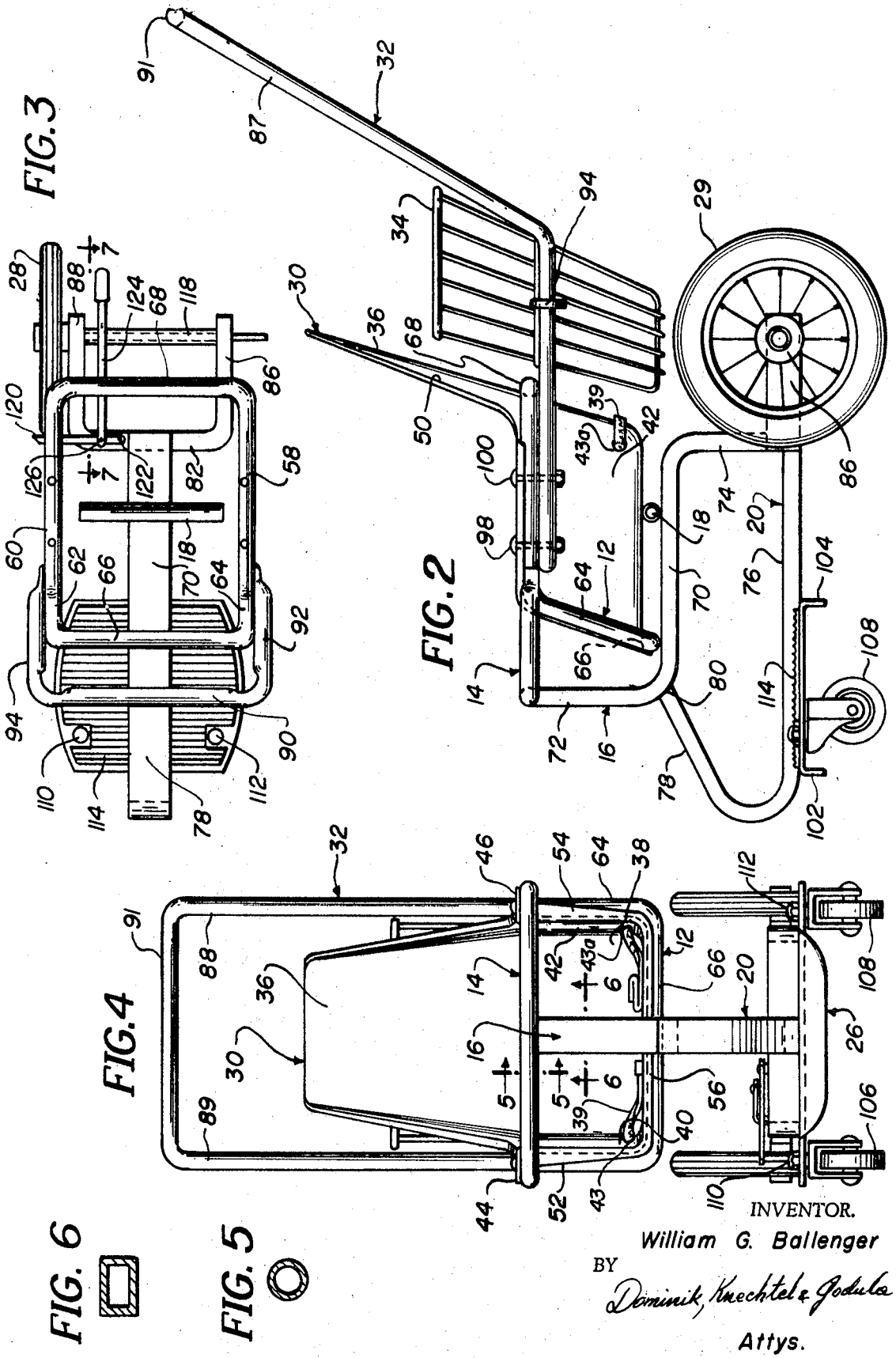

United States Patent Office
3,524,655
Patented Aug. 18, 1970

3,524,655
INFANT STROLLER
William G. Ballenger, Highland Park, Ill., assignor to Central Specialties Co., Chicago, Ill., a corporation of Illinois
Filed Sept. 18, 1968, Ser. No. 760,424
Int. Cl. B62b 7/00
U.S. Cl. 280—47.38                6 Claims

ABSTRACT OF THE DISCLOSURE

An infant stroller in which a unitary seat structure is nested in a seat support and secured along flanges extending from the sides of the seat structure. The seat support has transverse support members for the bottom of the seating area of the seat structure. A skirt portion along the front edges of the seat structure abuts elongated members of the seat support to attain a securely seated assembly. A supporting frame on the stroller includes rigid tubular members formed into shapes which coact with the seat supports and other members to provide a rigid structure. The infant stroller is adapted for use by shoppers and is provided with a mounted basket. A brake structure, mounted on the supporting frame, is locked with the wheel shaft to provide a holding brake action.

---

This invention relates to an infant stroller, and particularly relates to a rugged stroller of improved construction useful to shoppers.

A variety of strollers for infants have been designed in which sturdy construction is relegated to a lesser importance in favor of other features such as attractiveness and portability. For some areas of use, such features are not most important as compared to sturdiness, durability, comfort, and other features which primarily serve function rather than convenience or esthetics. One such recognized area of use is a stroller for shoppers in stores such as supermarkets, department stores, and stores which generally purvey portable saleable articles.

The female shopper is commonly found in such stores, and frequently is accompanied by infants. While the lady shopper may bring with her a portable or collapsible infant stroller, this is a marked inconvenience, and the shopper is not enthusiastic about carrying such strollers. It is a recognized inducement to such shoppers for the stores to provide infant strollers. It will be appreciated that such infant strollers should be of rugged construction to hold up under frequent and severe use in repeated shopping days. It is highly desirable to provide an improved rugged construction which is sturdy, which is safe for the infant, which is comfortable and which additionally is attractive. It is likewise desirable that such a stroller be provded with container means to facilitate the carrying of purchased articles.

It is accordingly one important object of the invention to provide an infant stroller of improved construction which is durable and rugged to hold up under repeated and severe usages.

Another important object is to provide an infant stroller having a comfortable seat structure which can be easily cleaned and which can be simply and securely mounted to a supporting frame structure.

Yet another important object is to provide an infant stroller having a strong and rugged supporting frame structure which is of relatively simple construction and which does not require supporting or bracing parts or the like.

Still another important object is to provide an infant stroller in which a unitary seat structure may be securely fastened to a supporting frame to attain safety for the infant, while requiring few fastening means which are removed from any areas which would cause discomfort to the infant or provide an undue number of broken surfaces which would provide undesirable locations for collecting debris.

Still another important object is to provide an infant stroller in which a unitary seat structure is provided with means which coact in an improved way with tubular members of a seat support to attain a more secure nested position of the seat structure in the supporting frame.

Yet another important object is to provide an infant stroller wherein parts of the stroller, such as infant grasping members and pushing bars, are secured to the stroller without requiring an increase of fastening means over those provided to secure the seat structure to the supporting frame.

Yet another important object is to provide an infant stroller of the type described in which provision is made to mount a shopping basket in an improved way without incurring awkward placement on the stroller which would interfere with the shopper or with the operation of the stroller.

It is another important object to provide an infant stroller of the type described in which an improved and conveniently placed braking structure is simply and reliably operated for braking action and for braking release.

Objects such as those recited are attained with still other objects which will occur to practitioners from time to time by the invention of the following disclosure, including drawings wherein:

FIG. 2 is a side elevational view of an assembled infant stroller according to the present invention;

FIG. 3 is a top plan view of the infant stroller shown in FIG. 2, with push-bar, seat and one wheel removed;

FIG. 4 is a front elevational view of the infant stroller shown in FIG. 2;

FIG. 5 is a view along sectional line 5—5 of FIG. 4;

FIG. 6 is a section view along line 6—6 of FIG. 4; and

The use of the same numerals in the various views will indicate a reference to like structures, parts, or elements as the case may be.

Figure 1:
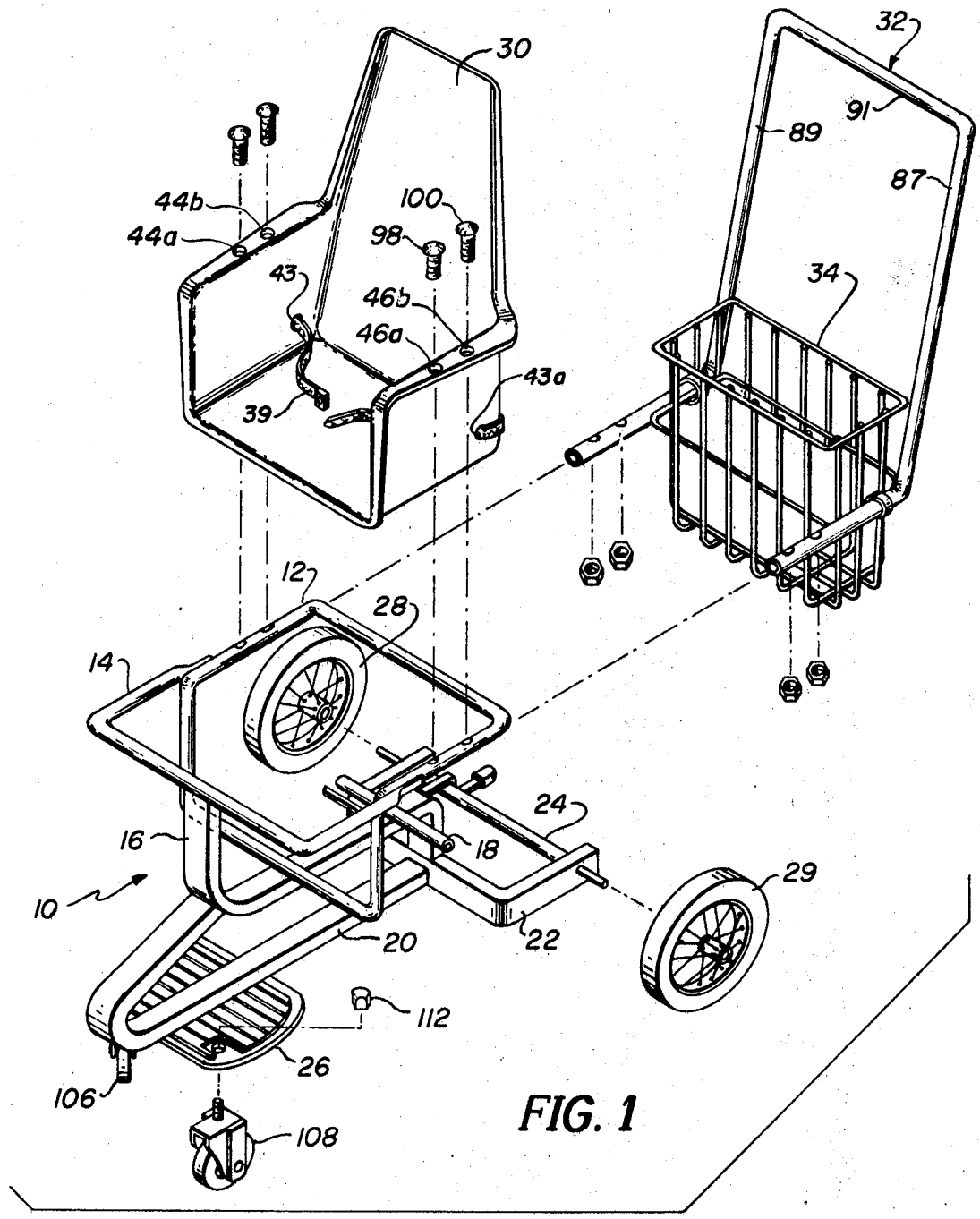
FIG. 1 is an exploded perspective view showing various removably mounted parts.

Referring to the exploded perspective view of FIG. 1, certain parts are indicated as being removably mounted to a stroller body indicated generally as 10. Such stroller body has an angular, tubular seat support 12, and an infant grasping member 14 secured to the angular seat support 12. The combined seat support and infant grasping member are secured to upper tubular frame support 16, and a transverse elongated seat support 18 is likewise secured to said upper frame support 16. A lower tubular frame support 20 is secured to the upper frame support and to a rear tubular frame support 22. A wheel shaft 24 extends through the rear frame support. A foot rest platform 26 is secured to the lower frame support 20.

Wheels 28 and 29 are removably mounted to the wheel shaft 24. A seat 30 is removably mounted to seat support 12, and an angular push-bar 32 is likewise mounted to seat support 12. A shopping basket 34 is provided for mounting between the push-bar 32. Other structural details will now be described, with particular reference to the other views of the drawings.

The seat structure comprises a unitary body or shell which is preferably molded from substantially rigid plastic, such as polypropylene. The seat structure includes a backrest 36, a seating area 38, a safety belt 39, and spaced side walls 40 and 42. The belt 39 is shown passing through openings 43, 43a in the side walls. The top edges of the side walls have flanges 44 and 46 extending normally and outwardly relatively to the adjoining side walls. Each of the flanges are shown provided with apertures such as 44a, 44b, and 46a and 46b. The free edging of the seat structure is shown as having a turned-back lip or skirt portion, and this includes a backrest skirt portion 50 which merges into the side wall flanges. The front edges of the side walls have similar skirt portions 52 and 54, and the front edge of the seating area has a skirt portion 56. All the skirt portions are somewhat arcuate in configuration, and it is seen that the side wall skirt portions 52 and 54 extend outwardly relative to the side walls, while the seating area skirt portions 56 depends downwardly relative to the seating area of the seat structure.

The seat structure is adapted to nestingly engage the seat support which is shown as an angular loop having spaced members 58 and 60 which lie in a common and substantially horizontal plane. The horizontally spaced side members merge into downwardly extending members 62 and 64, both of which lie in a common plane of which forms a somewhat oblique angle with the plane of the horizontally spaced members. The downwardly extending members are connected by a transverse support member 66, and the horizontally spaced members are connected by a backrest support member 68 which closes the angular loop of the seat support.

Transverse member 66 of the seat support and spaced elongated transverse support member 18 are secured to intermediate branch 70 of the upper support frame which further includes upwardly extending branch 72 and downwardly extending branch 74. A lower frame support has a linear branch 76 and a backwardly bent branch 78. The end of branch 78 is secured to rounded bend 80 of the upper frame support, and the end of the linear branch 76 is secured to connecting branch 82 of the rear frame support. The bottom of downwardly extending branch 74 of the upper frame support is likewise secured to the top of the connecting branch 82 of the rear frame support.

The rear frame support is generally U-shaped and includes spaced arms 86 and 88 which are normal to connecting branch 82.

A generally U-shaped infant grasping portion has a cross piece 90 which is secured to the top of upwardly extending branch 72 of the upper frame support. The side arms 92 and 94 of the infant grasping portion are secured to the spaced horizontal members 58 and 60, respectively, of the seat support. The areas and points where support frame members, seat supports, infant grasping members, and the like, are secured to one another are not shown or described in detail, since conventional means may be used, including welds, bolts, various interlocks, or other means.

The angular push-bar is shown with spaced angle members 87 and 89 which are connected by cross piece or push-bar 92. The lower parts of the angle members are in one plane and the upper parts are in another plane which forms an oblique angle with the plane of the lower parts. It will be seen that the plane of the upper parts of the push member is spaced from the backrest 36 a sufficient distance to accommodate the wire basket 34 which is removably mounted to the lower parts by flexible metal straps such as 94. Each of the lower parts of the angular arms 87 and 89 of the push member have apertures which can be registered with like apertures in each of the spaced members 58 and 60 of the seat support. Such registered apertures are then registered with apertures 44a, 44b, and 46a, 46b in the seat flanges. Two fastening bolts, such as 98 and 100, are only required on each side to secure the seat structure to the seat support and to the push bar member.

It is preferred that the seat support, the transverse supporting member 18, the infant grasping portion, and the push-bar member be tubular members as indicated in the sectional view of FIG. 5. Such tubular members are relatively lightweight, but sturdy, and particularly lead to an advantageous nesting position with the arcuate skirt portions at the front edges of the side walls and seating area. It will be seen that downwardly extending members 62 and 64 and connecting support member 66 of the seat support snugly abut or are seated against the curved skirt portions at such front edges. This feature markedly contributes to providing a secure and stable position of the seat structure within the seat support.

It is preferred that the upper, lower, and rear tubular frame supports have a rectangular cross section and be formed from a metal having a greater gauge relative to the gauge of the tubular members. Such a cross sectional configuration is seen in the view of FIG. 6 and the relative increase in gauge is also viewed by comparing FIGS. 5 and 6.

The foot rest platform is shown as having a depending forward flange 102 and a depending rearward flange 104. Casters 106 and 108 are removably mounted to the platform by bolts 110 and 112. The platform may have a tread surface 114 bonded to the upper surface thereof.

Figure 7:
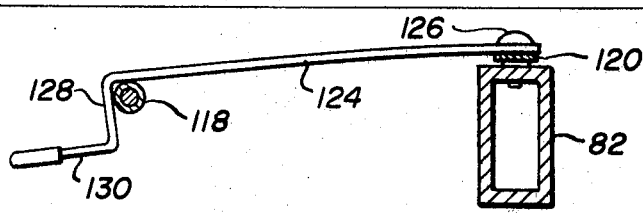
FIG. 7 is a view along section line 7—7 of FIG. 3, partly in section and with parts removed for purposes of clarity.

A braking structure is mounted on the rear frame member and coacts with an enlarged diameter sleeve 118 on the rear wheel shaft. The braking structure includes an elongated member 120 which is joined to the top of the cross branch 82 of the rear frame member by a pivot 122. A link arm 124 is secured at 126 to elongated member 120 intermediate the ends thereof. Link member 124 has a resilient bend 128, normally urged clockwise in the view of FIG. 7. Foot engaging portion 130 extends from the bend 128. When the brake is released, the resilient bend 128 is disengaged from sleeve 118 at a position above such sleeve, and the link member is rotated counterclockwise relative to the view of FIG. 3 so that said link member is disposed angularly relative to the arm 88 or the rear frame member. When it is desired to engage the brake, the link member is moved to the position shown in the view of FIG. 3, or substantially parallel to arm 88, and the resilient bend is moved into locking engagement with sleeve 118 by depressing portion 130 with the foot. The brake is simply released by kicking portion 130 upwardly to release the interlock of the resilient bend 128 with the sleeve 118, and rotating the link arm 124 to move the leading edge of elongated member 120 out of braking engagement with the wheel 29.

It will be seen that the positions of the upper, lower and rear tubular frame supports provides an extremely rugged and durable frame support with an economy of structural parts and materials. It will also be seen that the angular seat support nests the seat structure and provides support points at the backrest, under the side wall flanges and at the front edges of the side walls and seating area. The seat structure is further supported by a transverse member mounted to the upper frame support. The seat structure assembly is nested and securely held with only a few fasteners at each side. The same fasteners are employed to secure the handle or push-bar member to the angular seat support. The container basket is advantageously mounted between the lower parts of the angular members of the push-bar member without projecting substantially beyond said push-bar member. The combination leads to compactness and sturdiness with an economy of parts which are disposed in an attractive manner. These advantages are attained with a disclosed four wheel stroller which additionally provides desired stability so that the stroller resists attempts to be upset by the child, or otherwise.

The invention may now be practiced in the various ways which will occur to practitioners, and such practice will be a part of the invention so long as it comes within the terms of the following claims as given further meaning by the language of the preceeding specification.

What is claimed is:

1. In an infant stroller having a supporting frame and wheels rotatably mounted to the supporting frame, a unitary seat structure having a backrest, a seating area and spaced side walls joining the opposite sides of the seating and backrest areas, a flange extending outwardly from the top edge of each side wall, a continuous skirt portion extending downwardly from the seating area and outwardly from the front edges of the side walls, an angular seat support formed by a continuous tubular structure, said angular seat support fixed to said frame support and having laterally spaced members in one common plane, said laterally spaced members accommodating the seat structure and supportingly abutting the undersides of the flanges extending outwardly from the top edges of the side walls, a rearwardly transverse member between said laterally spaced members, downwardly spaced members lying in a common plane and a forwardly transverse member extending between said downwardly spaced members, said forwardly transverse member being fixed to said supporting frame, the downwardly extending skirt portion of the seat structure engaging said forwardly transverse member and said outwardly extending skirt portion engaging said downwardly spaced members, at least one additional transverse support member fixed to said supporting frame to supportingly engage said seat structure, and fastening means removably securing the flanges at the top edges of the side walls to said laterally spaced members of the angular seat support.

2. In a stroller which comprises the elements of claim 1 above, said supporting frame including an upper tubular frame support and a lower tubular frame support secured to said upper frame support, said upper frame support having an upwardly extending branch, a downwardly extending branch and an intermediate branch joining the bottom of the upwardly extending and the top of the downwardly extending branches, said intermediate branch having said transverse members secured thereto, said lower frame support having a linear branch and a backwardly bent forward branch, the end of said backwardly bent forward branch being secured to said upper frame support substantially at the junction of the upward branch and the intermediate branch thereof, and the downward branch of said upper frame support being secured to said linear branch of the lower frame support.

3. In a stroller which includes the elements of claim 2 above, and which further includes a generally U-shaped infant grasping member having spaced side arms and a connecting cross piece, said side arms secured to the laterally spaced members of the seat support, and the upward branch of said upper tubular frame member secured to the connecting cross piece of the infant grasping member.

4. In a stroller comprising the elements of claim 3 above, and which further includes an angular push bar member, including spaced angle members, each of which has an upper part connected by a cross piece and a lower part, each lower part positioned below the laterally spaced members of the seat support, and being secured to said laterally spaced members and to the seat flanges.

5. In a stroller comprising the elements of claim 4 above, and which further includes a container basket removably secured to the lower parts of said angle members, said basket being positioned intermediate the backrest of the seat structure and the upwardly extending spaced arms of said push member angle.

6. In a stroller comprising the elements of claim 1 above, and further including a generally U-shaped rear tubular frame support with a cross piece secured intermediate its ends to the end of the linear branch of the lower frame support and to the bottom of the downwardly extending branch of said upper frame support, and a rear wheel axle mounted through openings on the opposite ends of spaced arms of the said generally U-shaped member, and a braking member mounted to the top of said tubular cross piece, including an elongated member pivoted at one of its ends to said generally U-shaped member, an elongated linking member secured to said pivotable member intermediate its ends, and a resilient bend in said linking member having a depending portion which resiliently engages said wheel shaft to thereby hold said pivotal member against the wheel in braking action.

References Cited

UNITED STATES PATENTS

| 2,450,051 | 9/1948 | Manning | 280—36 |
| 2,711,328 | 6/1955 | Shone et al. | 280—41 |
| 2,969,830 | 1/1961 | Thompson | 297—136 |
| 2,984,291 | 5/1961 | Kostenborder et al. | 297—130 |
| 3,110,504 | 11/1963 | Myers | 280—36 |

FOREIGN PATENTS 1,077,198    7/1967    Great Britain.

BENJAMIN HERSH, Primary Examiner

L. J. PAPERNER, Assistant Examiner

U.S. Cl. X.R.

188—20, 74